United States Patent
Park

(10) Patent No.: US 11,066,063 B2
(45) Date of Patent: Jul. 20, 2021

(54) METHOD FOR CONTROLLING TORQUE OF DIESEL HYBRID VEHICLE

(71) Applicants: Hyundai Motor Company, Seoul (KR); Kia Motors Corporation, Seoul (KR)

(72) Inventor: Jae Beom Park, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 302 days.

(21) Appl. No.: 16/414,230

(22) Filed: May 16, 2019

(65) Prior Publication Data

US 2020/0180598 A1 Jun. 11, 2020

(30) Foreign Application Priority Data

Dec. 11, 2018 (KR) .................... 10-2018-0159218

(51) Int. Cl.
| | |
|---|---|
| *B60W 20/16* | (2016.01) |
| *B60K 6/24* | (2007.10) |
| *B60W 10/06* | (2006.01) |
| *B60W 10/08* | (2006.01) |
| *B60W 50/00* | (2006.01) |

(52) U.S. Cl.
CPC ............. *B60W 20/16* (2016.01); *B60K 6/24* (2013.01); *B60W 10/06* (2013.01); *B60W 10/08* (2013.01); *B60W 50/00* (2013.01); *B60W 2050/0026* (2013.01); *B60W 2050/0039* (2013.01); *B60W 2710/0644* (2013.01); *B60W 2710/0666* (2013.01); *B60W 2710/081* (2013.01); *B60W 2710/083* (2013.01); *B60Y 2200/92* (2013.01); *B60Y 2400/432* (2013.01)

(58) Field of Classification Search
CPC ...... B60W 20/16; B60W 10/06; B60W 10/08; B60W 50/00; B60W 2710/0666; B60W 2050/0026; B60W 2710/081; B60W 2710/083; B60W 2710/0616; B60W 20/11; B60K 6/24; B60Y 2400/432; B60Y 2200/92; Y02T 10/62
See application file for complete search history.

(56) References Cited

U.S. PATENT DOCUMENTS

| | | | |
|---|---|---|---|
| 6,278,915 B1 * | 8/2001 | Deguchi ............... | B60W 10/04 701/22 |
| 2013/0151045 A1 * | 6/2013 | Park ...................... | B60W 20/00 701/22 |
| 2016/0304084 A1 * | 10/2016 | Kawai ..................... | B60K 6/50 |

FOREIGN PATENT DOCUMENTS

KR 101157413 B1 6/2012

* cited by examiner

*Primary Examiner* — Marthe Y Marc-Coleman
(74) *Attorney, Agent, or Firm* — Slater Matsil, LLP

(57) ABSTRACT

A method can be used for controlling torque of a diesel hybrid vehicle. The method includes calculating energy consumptions of an engine for respective engine torques within an engine torque range and calculating energy consumptions of a battery for respective motor torques within a motor torque range. A plurality of total energy consumptions can be calculated based on the energy consumptions of the engine and the energy consumptions of the battery. The torque of the diesel hybrid vehicle can be controlled based on an engine torque and a motor torque that are relevant to the minimum of the plurality of total energy consumptions. The energy consumptions of the engine are calculated based on a lower heating value of fuel, fuel consumption rates, and nitrogen oxide (NOx) emissions.

20 Claims, 6 Drawing Sheets

METHOD FOR CONTROLLING TORQUE OF DIESEL HYBRID VEHICLE

CROSS-REFERENCE TO RELATED APPLICATIONS

This application claims priority to Korean Patent Application No. 10-2018-0159218, filed in the Korean Intellectual Property Office on Dec. 11, 2018, which application is hereby incorporated herein by reference.

TECHNICAL FIELD

The present disclosure relates to a technology for controlling torque of a diesel hybrid vehicle.

BACKGROUND

A hybrid vehicle or a hybrid electric vehicle is a vehicle that combines a function of a petroleum-based fuel vehicle, which uses only gasoline, diesel, or gas, and a function of an electric vehicle, which uses only a battery, to solve an exhaust gas problem in the petroleum-based fuel vehicle and a battery life problem in the electric vehicle.

In recent years, environmentally-friendly vehicles have been increasingly demanded to meet a demand for improving vehicle fuel economy and respond to tightening regulations on automobile exhaust gas in countries, and hybrid electric vehicles have attracted attention as a realistic alternative to the environmentally-friendly vehicles.

The hybrid electric vehicles include a series hybrid electric vehicle (SHEV), a parallel hybrid electric vehicle (PHEV), and the like.

The parallel hybrid electric vehicle includes an engine that uses fossil fuel and a motor that supplements engine output and that is powered by electricity. Motor output may be adjusted according to a control value (e.g., the intensity of supply voltage) that is determined by a motor control unit according to a driving (travel) condition of the vehicle, and output power of the motor is transferred to an engine output shaft to supplement output power of the engine.

A motor output shaft is connected to one end of the engine output shaft, specifically, the crank shaft directly or through a belt or a chain to supplement engine output, and a transmission for providing controlled application of engine power to drive wheels according to a driving situation is provided at an output end of the crank shaft on the opposite side to the motor to intermittently receive power from the engine through a clutch.

The parallel hybrid electric vehicle has advantages of reducing an engine displacement volume, producing a high power output, and significantly reducing harmful exhaust gas. In addition, the parallel hybrid electric vehicle is easy to design and not expensive to install due to the simple structure thereof and is therefore advantageous for securing cost competitiveness. Meanwhile, the parallel hybrid electric vehicle is complex in terms of control because the ratio between engine output and motor output has to be adjusted according to a driving situation.

The strategy by which a hybrid control unit (HCU) for controlling the hybrid electric vehicle determines the ratio between engine output and motor output is one of the most critical and essential control strategies. The hybrid control unit has to satisfy Equation 1 below, in determining the ratio between engine output and motor output.

$$P_R = P_{EG} + P_B \quad \text{[Equation 1]}$$

Here, PEG, PB, and PR denote an engine torque, a motor torque, and a torque requirement, respectively.

For example, assuming that the torque requirement PR set by a driver operation of an accelerator pedal is "3" and the engine torque PEG determined according to a driving situation at that time is "2", the motor torque PB is "1".

A technology for controlling torque of a diesel hybrid vehicle in the related art uses the equivalent consumption minimization strategy (ECMS) to determine an engine torque and a motor torque. That is, the technology for controlling the torque of the diesel hybrid vehicle in the related art calculates an operable torque range of an engine (hereinafter, referred to as the engine torque range) and an operable torque range of a motor (hereinafter, referred to as the motor torque range) at the current torque requirement, based on the maximum torque and the minimum torque of the engine, which are hardware characteristics thereof, and the maximum torque and the minimum torque of the motor, which are hardware characteristics thereof, calculates energy consumption of the engine and energy consumption of the motor, and determines an engine torque and a motor torque that minimize the addition of the energy consumption of the engine and the energy consumption of the motor, within the engine torque range and the motor torque range.

The technology for controlling the torque of the diesel hybrid vehicle in the related art has a problem in that the technology is able to minimize a fuel consumption rate, but causes excessive nitrogen oxide (NOx) emissions because the technology calculates the energy consumption of the engine without consideration for NOx emissions.

SUMMARY

The present disclosure can solve the above-mentioned problems occurring in the prior art while advantages achieved by the prior art are maintained intact.

An aspect of the present disclosure provides a method for controlling torque of a diesel hybrid vehicle, in which the method calculates energy consumptions of an engine based on a lower heating value of fuel, fuel consumption rates, and nitrogen oxide (NOx) emissions, when determining an engine torque and a motor torque based on the equivalent consumption minimization strategy (ECMS) in the diesel hybrid vehicle, thereby reducing nitrogen oxide emissions as well as minimizing a fuel consumption rate.

The technical problems to be solved by the present disclosure are not limited to the aforementioned problems, and any other technical problems not mentioned herein will be clearly understood from the following description by those skilled in the art to which the present disclosure pertains. Also, it will be easily understood that the aspects and advantages of the present disclosure can be accomplished by the means set forth in the appended claims and combinations thereof.

According to an aspect of the present disclosure, a method for controlling torque of a diesel hybrid vehicle includes calculating energy consumptions of an engine for respective engine torques within an engine torque range, calculating energy consumptions of a battery for respective motor torques within a motor torque range, calculating a plurality of total energy consumptions, based on the energy consumptions of the engine and the energy consumptions of the battery, and controlling the torque of the diesel hybrid vehicle, based on an engine torque and a motor torque that are relevant to the minimum of the plurality of total energy consumptions. The energy consumptions of the engine are calculated based on a lower heating value of fuel, fuel consumption rates, and nitrogen oxide (NOx) emissions.

The calculating of the energy consumptions of the engine may include detecting fuel consumption rates that correspond to the respective engine torques within the engine torque range and engine speeds relevant to the respective engine torques, based on a map having fuel consumption rates recorded therein, which are relevant to engine torques and engine speeds.

The calculating of the energy consumptions of the engine may include assigning weighting values to each of the fuel consumption rates and a corresponding one of the NOx emissions, respectively, adding the fuel consumption rate and the corresponding one NOx emission to which the weighting values are assigned, and multiplying the addition result by the lower heating value of the fuel.

The calculating of the energy consumptions of the engine may include calculating each of the energy consumptions $\vec{P}_{fuel}$ of the engine, based on the following Equation A.

$$\vec{P}_{fuel} = Q_{LHV}((1-x_{NO_x}) \cdot \dot{m}_{fuel} + x_{NO_x} \cdot \dot{m}_{NO_x}) \quad \text{[Equation A]}$$

Here, QLHV denotes the lower heating value of the fuel, $x_{NO_x}$ denotes a weighting value, $\dot{m}_{fuel}$ denotes a fuel consumption rate, and $\dot{m}_{NO_x}$ denotes a NOx emission.

The calculating of the energy consumptions of the engine may include detecting the NOx emissions, based on an air system model and a raw NOx model.

The air system model may process a variable, the actual measured value of which is less responsive than a target, among input variables of the raw NOx model to improve performance of the raw NOx model.

The air system model may receive inputs of an air mass set of the engine, a low pressure-exhaust gas recirculation (LP-EGR) valve duty, a variable geometry turbocharger (VGT) vane duty, and a boost pressure set and may output an air mass and a boost pressure relevant thereto.

The raw NOx model may receive inputs of an engine RPM, a fuel quantity per stroke, main timing, pilot timing, a pilot quantity, the air mass, and the boost pressure and may output NOx emissions relevant thereto.

The raw NOx model may be a model that expresses a correlation between an input variable and an output variable for the engine as an equation in the form of an exponential function through a Gaussian process model.

The calculating of the energy consumptions of the battery may include detecting energy consumptions of a motor that correspond to the respective motor torques within the motor torque range and motor speeds relevant to the respective motor torques, based on a map having energy consumptions of the motor recorded therein, which are relevant to motor torques and motor speeds and detecting energy consumptions of the battery that are relevant to the detected energy consumptions of the motor, based on a map having energy consumptions of the battery recorded therein, which are relevant to energy consumptions of the motor.

The method of the present disclosure may further include calculating an engine torque range and a motor torque range at a current torque requirement.

The calculating of the engine torque range and the motor torque range may include calculating the engine torque range and the motor torque range at the current torque requirement, based on a maximum torque and a minimum torque of the engine, which are hardware characteristics of the engine, and a maximum torque and a minimum torque of the motor, which are hardware characteristics of the motor.

The calculating of the engine torque range and the motor torque range may further include calculating the engine torque range by subtracting the motor torque range from the current torque requirement.

According to another aspect of the present disclosure, a method for controlling torque of a diesel hybrid vehicle includes calculating energy consumptions of an engine based on a lower heating value of fuel, fuel consumption rates, and nitrogen oxide (NOx) emissions when determining an engine torque and a motor torque based on the equivalent consumption minimization strategy (ECMS) in the diesel hybrid vehicle, and controlling the torque of the diesel hybrid vehicle, based on the engine torque and the motor torque determined.

The calculating of the energy consumptions of the engine may include detecting fuel consumption rates that correspond to respective engine torques within an engine torque range and engine speeds relevant to the respective engine torques, based on a map having fuel consumption rates recorded therein, which are relevant to engine torques and engine speeds.

The calculating of the energy consumptions of the engine may include assigning weighting values to each of the fuel consumption rates and a corresponding one of the NOx emissions, respectively, adding the fuel consumption rate and the corresponding one NOx emission to which the weighting values are assigned, and multiplying the addition result by the lower heating value of the fuel.

The calculating of the energy consumptions of the engine may include calculating each of the energy consumptions $\vec{P}_{fuel}$ of the engine, based on Equation A above.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF ILLUSTRATIVE EMBODIMENTS

Figure 1:
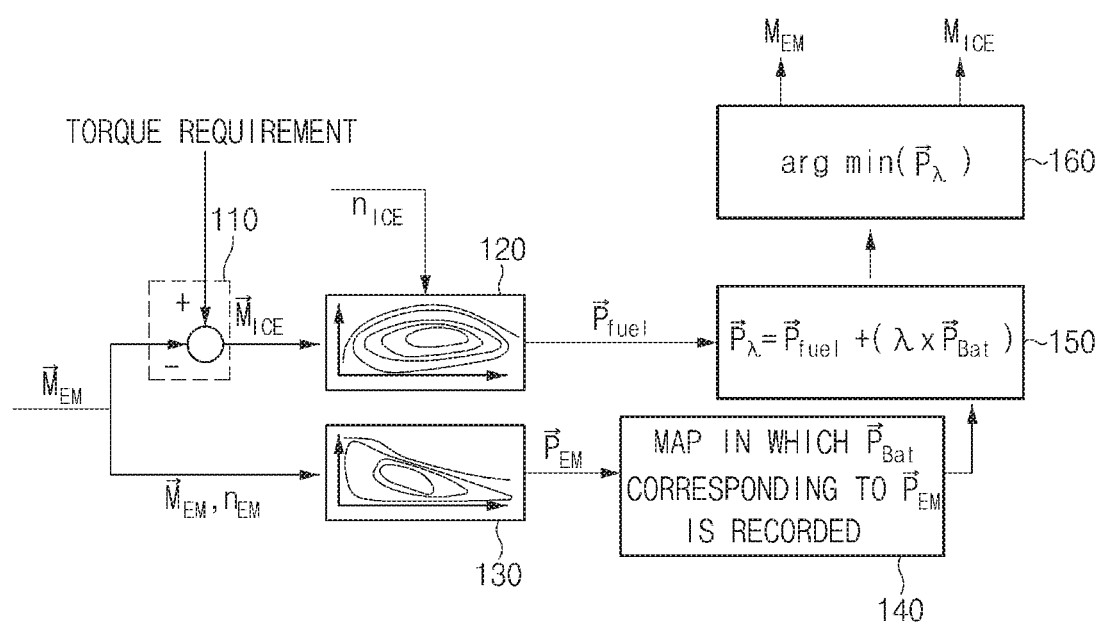
FIG. 1 is a view illustrating a method for controlling torque of a diesel hybrid vehicle according to an embodiment of the present disclosure.

Hereinafter, exemplary embodiments of the present disclosure will be described in detail with reference to the accompanying drawings. It should be understood that even if shown in different drawings, identical components are provided with identical reference numerals in the drawings. Furthermore, in describing the embodiments of the present disclosure, detailed descriptions related to well-known functions or configurations will be omitted when they may make subject matters of the present disclosure unnecessarily obscure.

Terms, such as "first", "second", "A", "B", "(a)", "(b)", and the like, may be used herein to describe components of the present disclosure. Such terms are only used to distinguish one component from another component, and the substance, sequence, order, or number of these components is not limited by these terms. Unless otherwise defined, all terms used herein, including technical and scientific terms, have the same meaning as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a view illustrating a method for controlling torque of a diesel hybrid vehicle according to an embodiment of the present disclosure, where each process may be performed by a hybrid control unit (HCU) or a processor.

First, the HCU calculates an operable torque range of an engine (hereinafter, referred to as the engine torque range) and an operable torque range of a motor (hereinafter, referred to as the motor torque range) at the current torque requirement, based on the maximum torque and the minimum torque of the engine, which are hardware characteristics thereof, and the maximum torque and the minimum torque of the motor, which are hardware characteristics thereof (Step 110). That is, the HCU calculates the engine torque range $\vec{M}_{ICE}$ by subtracting the motor torque range $\vec{M}_{EM}$ from the current torque requirement. This is the same as what is set forth in the ECMS. Therefore, a detailed description thereabout will be omitted.

Next, the HCU detects fuel consumption rates that correspond to respective engine torques within the calculated engine torque range and engine speeds relevant to the respective engine torques, based on a map having fuel consumption rates recorded therein, which are relevant to engine torques and engine speeds. In this case, a plurality of fuel consumption rates are detected because there are a plurality of engine torques and a plurality of engine speeds relevant thereto. For example, when fuel consumption rates are detected based on the assumption that the engine torque range is between 1 and 5 and engine torques are 1, 2, 3, 4, and 5, the number of fuel consumption rates detected is five.

Thereafter, the HCU calculates energy consumptions of the engine, based on the lower heating value (e.g., 11.8 KJ/kg) of fuel, the fuel consumption rates, and nitrogen oxide (NOx) emissions (Step 120). For example, the HCU may calculate the energy consumptions $\vec{P}_{fuel}$ of the engine, based on Equation 2 below.

$$\vec{P}_{fuel} = Q_{LHV}((1-x_{NO_x}) \cdot \dot{m}_{fuel} + x_{NO_x} \cdot \dot{m}_{NO_x}) \quad \text{[Equation 2]}$$

Here, QLHV denotes the lower heating value of fuel, $x_{NO_x}$ denotes a weighting value, $\dot{m}_{fuel}$ denotes a fuel consumption rate, and $\dot{m}_{NO_x}$ denotes a NOx emission (mass).

For reference, the lower heating value refers to the higher heating value minus the heat of vaporization of water vapor contained in combustion gas. Generally, in the case of solid or liquid fuel, calorie calculation is based on the lower heating value thereof. The reason is because moisture contained in the solid or liquid fuel has to be vaporized to gasify the fuel. The heat of vaporization of moisture is required for the transition from a liquid state to a gaseous state. The actual effective heating value of the fuel obtained by subtracting the heat of vaporization of moisture from the higher heating value is referred to as the lower heating value. During combustion, the temperature of combustion gas usually ranges from 200 to 300 degrees Celsius, and the combustion gas is just released to the outside. Therefore, there is little heat used for condensation.

Figure 2:
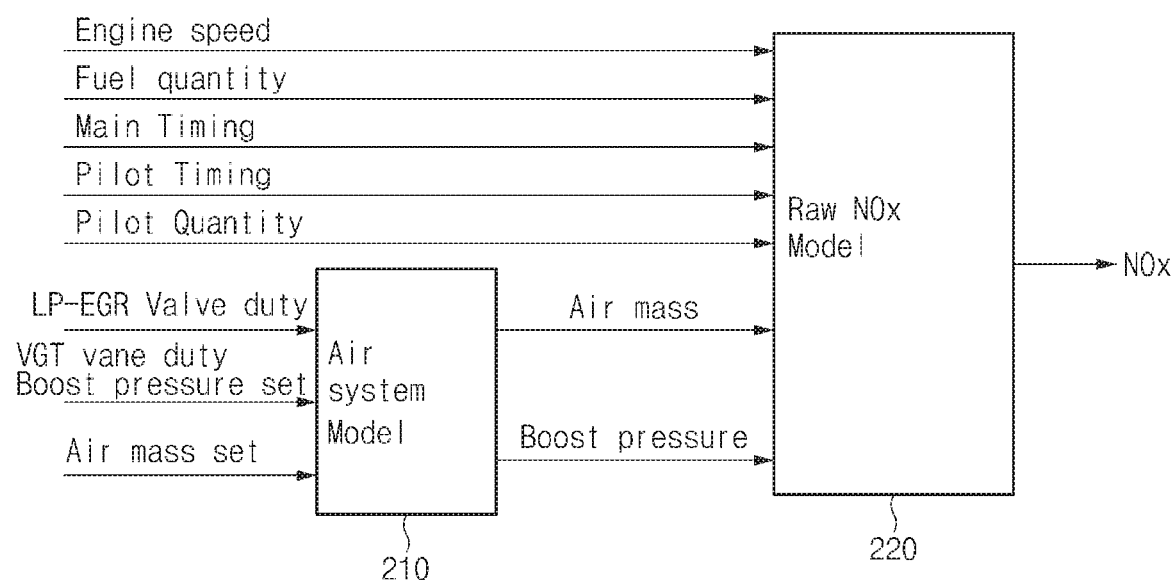
FIG. 2 is a structural view illustrating an air system model and a raw NOx model according to an embodiment of the present disclosure.

As illustrated in FIG. 2, the HCU may detect NOx emissions, based on an air system model 210 and a raw NOx model 220. In this case, the HCU may use the air system model 210 to process variables, the actual measured values of which are less responsive than targets, among input variables of the raw NOx model 220, thereby improving the performance of the raw NOx model 220.

In FIG. 2, the air system model 210 outputs an air mass and a boost pressure that correspond to an air mass set of the engine, a low pressure-exhaust gas recirculation (LP-EGR) valve duty that affects the boost pressure, a variable geometry turbocharger (VGT) vane duty that represents a boost open-loop, and a boost pressure set that represents a boost close-loop.

The raw NOx model 220 is a model with factors mainly affecting raw NOx as input variables, and the remaining variables other than an engine RPM (an engine speed) and a fuel quantity are set to target values.

Figure 3:
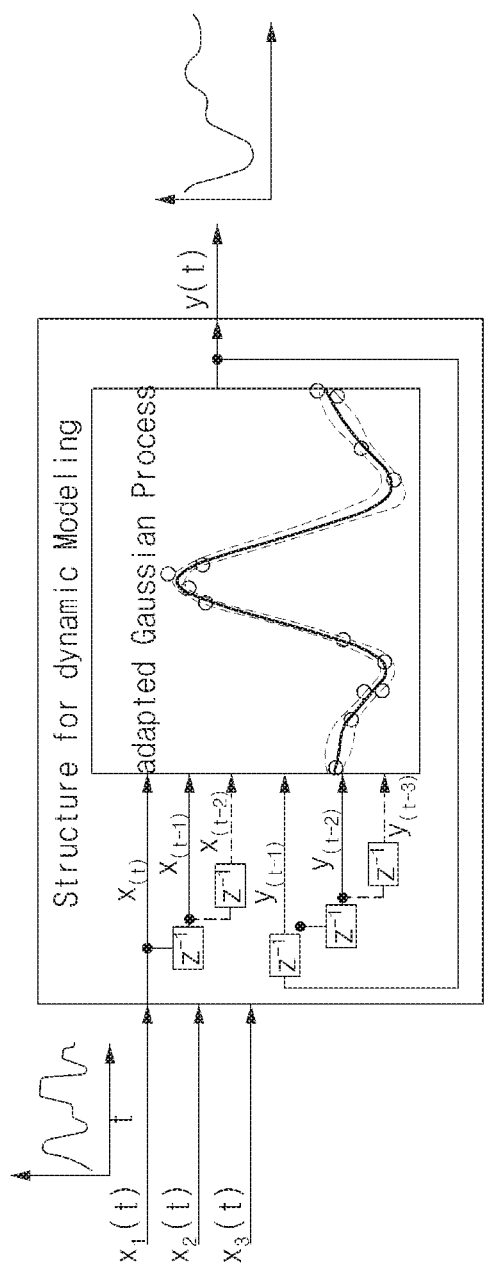
FIG. 3 is a detailed structural view illustrating the raw NOx model according to an embodiment of the present disclosure.

The raw NOx model 220 outputs NOx emissions (mass), based on an engine RPM, a fuel quantity per stroke (mg/st), main timing, pilot timing ('btdc), and a pilot quantity (mg/st) that affect raw NOx of the engine, and the actual air mass and the boost pressure calculated by the air system model 210. In this case, as illustrated in FIG. 3, the raw NOx model 220 may be a model that expresses a correlation between an input variable and an output variable (raw NOx) for the engine as an equation in the form of an exponential function through a Gaussian process model.

The HCU detects energy consumptions $\vec{P}_{EM}$ of the motor that correspond to respective motor torques $M_{EM}$ within the calculated motor torque range $\vec{M}_{EM}$ and motor speeds $n_{EM}$ relevant to the respective motor torques, based on a map having energy consumptions of the motor recorded therein, which are relevant to motor torques and motor speeds (Step 130). In this case, a plurality of energy consumptions are detected because there are a plurality of motor torques and a plurality of motor speeds relevant thereto. For example, when energy consumptions of the motor are detected based on the assumption that the motor torque range is between 1 and 5 and motor torques are 1, 2, 3, 4, and 5, the number of energy consumptions of the motor detected is five.

The HCU detects energy consumptions $\vec{P}_{Bat}$ of a battery relevant to the detected energy consumptions of the motor, based on a map having energy consumptions of the battery recorded therein, which are relevant to energy consumptions of the motor (Step 140).

The HCU calculates total energy consumptions, based on the detected energy consumptions $\vec{P}_{fuel}$ of the engine and the detected energy consumptions $\vec{P}_{Bat}$ of the battery (Step 150). In this case, the HCU may calculate the total energy consumptions $\vec{P}_\lambda$ based on Equation 3 below.

$$\vec{P}_\lambda = \vec{P}_{fuel} + (\lambda \times \vec{P}_{Bat}) \quad \text{[Equation 3]}$$

Here, λ refers to an equivalence factor.

The HCU detects an engine torque $M_{ICE}$ and a motor torque $M_{EM}$ at the minimum of the plurality of total energy consumptions calculated (Step 160).

Thereafter, the HCU may control the engine and the motor, based on the detected engine torque $M_{ICE}$ and the detected motor torque $M_{EM}$.

Figure 4:
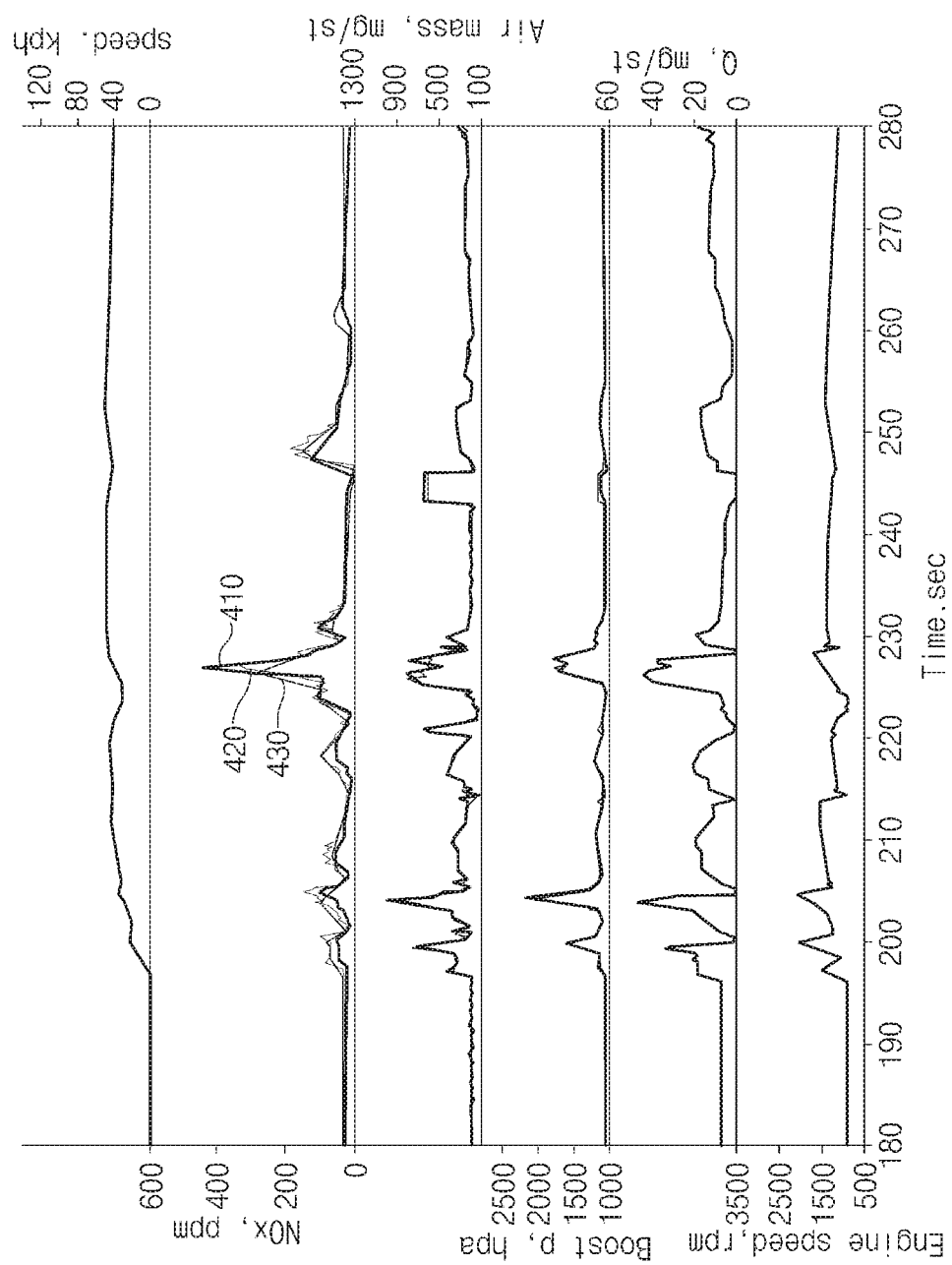
FIG. 4 is a view illustrating performance analysis of the method for controlling the torque of the diesel hybrid vehicle, according to an embodiment of the present disclosure.

FIG. 4 is a view illustrating performance analysis of the method for controlling the torque of the diesel hybrid vehicle, according to an embodiment of the present disclosure.

In FIG. 4, reference numeral 410 denotes NOx emissions from a diesel hybrid vehicle in the related art, reference numeral 420 denotes NOx emissions from a diesel hybrid vehicle according to an embodiment of the present disclosure, and reference numeral 430 denotes NOx emissions obtained by performing a simulation of the present disclosure through a model.

It can be seen that, as illustrated in FIG. 4, the peak value of the NOx emissions 420 from the diesel hybrid vehicle according to the embodiment of the present disclosure is lower than the peak value of the NOx emissions 410 from the diesel hybrid vehicle in the related art. That is, the diesel hybrid vehicle according to the embodiment of the present disclosure may prevent transient excessive emissions of NOx.

Figure 5:
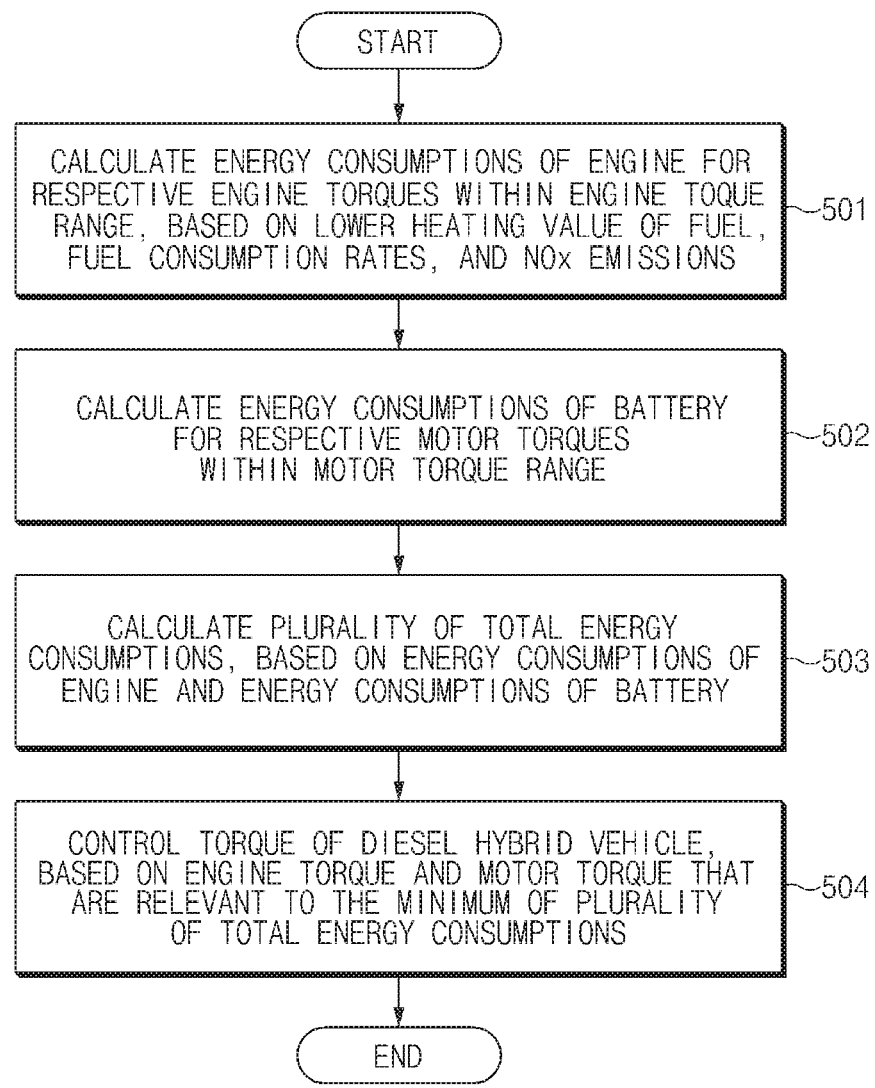
FIG. 5 is a flowchart illustrating a method for controlling torque of a diesel hybrid vehicle according to an embodiment of the present disclosure.

FIG. 5 is a flowchart illustrating a method for controlling torque of a diesel hybrid vehicle according to an embodiment of the present disclosure, where each process may be performed by a hybrid control unit (HCU) or a processor.

First, the HCU calculates energy consumptions of an engine for respective engine torques within an engine torque range, based on the lower heating value of fuel, fuel consumption rates, and nitrogen oxide (NOx) emissions (Step 501).

Next, the HCU calculates energy consumptions of a battery for respective motor torques within a motor torque range (Step 502).

Then, the HCU calculates a plurality of total energy consumptions, based on the energy consumptions of the engine and the energy consumptions of the battery (Step 503).

After that, the HCU controls the torque of the diesel hybrid vehicle, based on an engine torque and a motor torque that are relevant to the minimum of the plurality of total energy consumptions (Step 504).

Minimization of a fuel consumption rate and a reduction in nitrogen oxide emissions may be accomplished by the above-described method.

Figure 6:
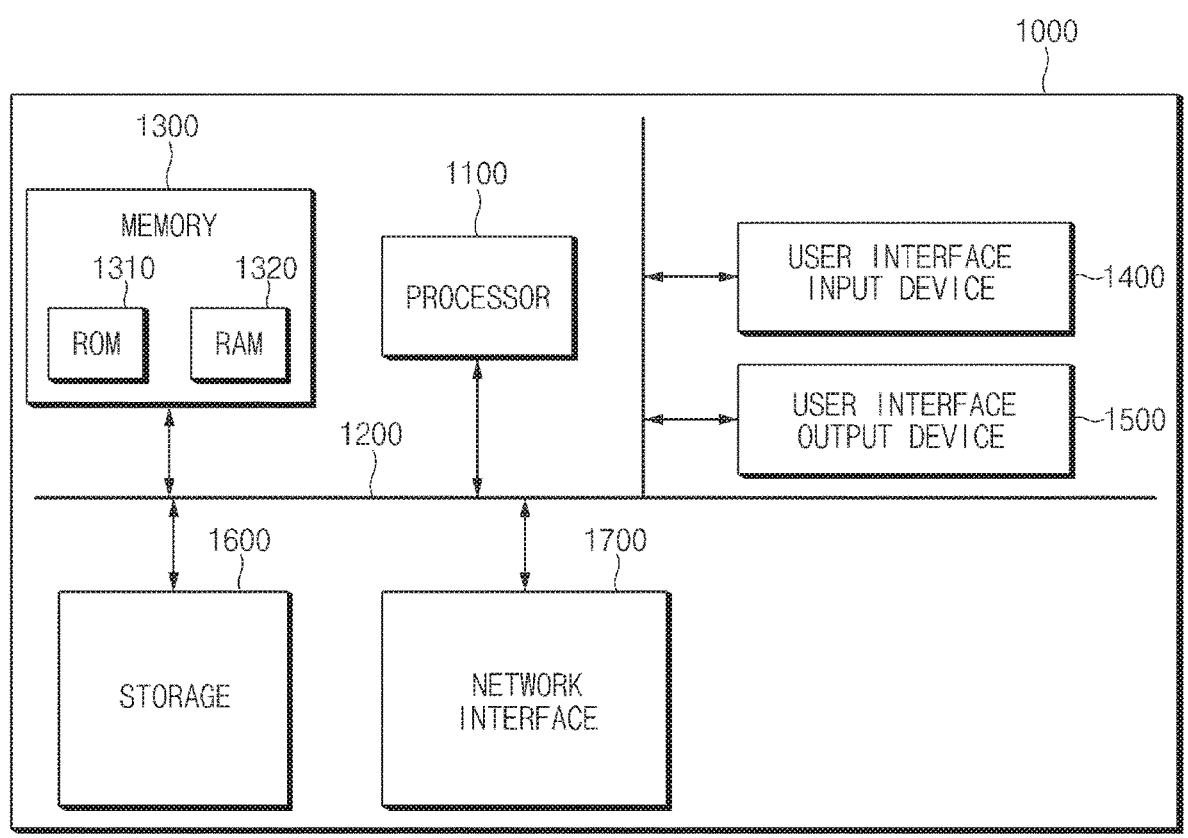
FIG. 6 is a block diagram illustrating a computing system for executing the method for controlling the torque of the diesel hybrid vehicle, according to an embodiment of the present disclosure.

FIG. 6 is a block diagram illustrating a computing system for executing the method for controlling the torque of the diesel hybrid vehicle, according to an embodiment of the present disclosure.

Referring to FIG. 6, the above-described method for controlling the torque of the diesel hybrid vehicle according to the embodiment of the present disclosure may be implemented through the computing system. The computing system 1000 may include at least one processor 1100, a memory 1300, a user interface input device 1400, a user interface output device 1500, storage 1600, and a network interface 1700 that are coupled together through a system bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage mediums. For example, the memory 1300 may include a read only memory (ROM) 1310 and a random access memory (RAM) 1320.

Accordingly, the steps of the methods or algorithms described in relation to the embodiments disclosed herein may be directly implemented by a hardware module or a software module executed by the processor 1100, or by a combination thereof. The software module may reside in a non-transitory storage medium (that is, the memory 1300 and/or the storage 1600) such as a RAM memory, a flash memory, a ROM memory, an EPROM memory, an EEPROM memory, a register, a hard disk, a solid state drive (SSD), a detachable disk, or a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside in a user terminal. In another case, the processor 1100 and the storage medium may reside in the user terminal as separate components.

The method for controlling the torque of the diesel hybrid vehicle according to the embodiment of the present disclosure calculates the energy consumptions of the engine based on the lower heating value of the fuel, the fuel consumption rates, and the nitrogen oxide (NOx) emissions when determining the engine torque and the motor torque based on the equivalent consumption minimization strategy (ECMS) in the diesel hybrid vehicle, thereby reducing nitrogen oxide emissions as well as minimizing a fuel consumption rate.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A method for controlling torque of a diesel hybrid vehicle, the method comprising:
   calculating energy consumptions of an engine for respective engine torques within an engine torque range;
   calculating energy consumptions of a battery for respective motor torques within a motor torque range;
   calculating a plurality of total energy consumptions based on the energy consumptions of the engine and the energy consumptions of the battery; and
   controlling the torque of the diesel hybrid vehicle based on an engine torque and a motor torque that are relevant to the minimum of the plurality of total energy consumptions, wherein the energy consumptions of the engine are calculated based on a lower heating value of fuel, fuel consumption rates, and nitrogen oxide (NOx) emissions.

2. The method of claim 1, wherein calculating the energy consumptions of the engine comprises detecting fuel consumption rates that correspond to the respective engine torques within the engine torque range and engine speeds relevant to the respective engine torques based on a map having fuel consumption rates recorded therein, which are relevant to engine torques and engine speeds.

3. The method of claim 1, wherein calculating the energy consumptions of the engine comprises:
assigning weighting values to each of the fuel consumption rates and a corresponding one of the NOx emissions, respectively;
adding the fuel consumption rate and the corresponding one NOx emission to which the weighting values are assigned; and
multiplying the addition result by the lower heating value of the fuel.

4. The method of claim 1, wherein calculating the energy consumptions of the engine comprises calculating each of the energy consumptions $\vec{P}_{fuel}$ of the engine, based on the following equation $$\vec{P}_{fuel} = Q_{LHV}((1-x_{NO_x}) \cdot \dot{m}_{fuel} + x_{NO_x} \cdot \dot{m}_{NO_x})$$

where $Q_{LHV}$ denotes the lower heating value of the fuel, $x_{NO_x}$ denotes a weighting value, $\dot{m}_{fuel}$ denotes a fuel consumption rate, and $\dot{m}_{NO_x}$ denotes a NOx emission.

5. The method of claim 1, wherein the calculating of the energy consumptions of the engine comprises detecting the NOx emissions based on an air system model and a raw NOx model.

6. The method of claim 5, wherein the air system model processes a variable, the actual measured value of which is less responsive than a target, among input variables of the raw NOx model to improve performance of the raw NOx model.

7. The method of claim 5, wherein the air system model receives inputs of an air mass set of the engine, a low pressure-exhaust gas recirculation (LP-EGR) valve duty, a variable geometry turbocharger (VGT) vane duty, and a boost pressure set and outputs an air mass and a boost pressure relevant thereto.

8. The method of claim 7, wherein the raw NOx model receives inputs of an engine RPM, a fuel quantity per stroke, main timing, pilot timing, a pilot quantity, the air mass, and the boost pressure and outputs NOx emissions relevant thereto.

9. The method of claim 8, wherein the raw NOx model is a model that expresses a correlation between an input variable and an output variable for the engine as an equation in the form of an exponential function through a Gaussian process model.

10. The method of claim 1, wherein calculating the energy consumptions of the battery comprises:
detecting energy consumptions of a motor that correspond to the respective motor torques within the motor torque range and motor speeds relevant to the respective motor torques based on a map having energy consumptions of the motor recorded therein, which are relevant to motor torques and motor speeds; and
detecting energy consumptions of the battery that are relevant to the detected energy consumptions of the motor based on a map having energy consumptions of the battery recorded therein, which are relevant to energy consumptions of the motor.

11. The method of claim 1, further comprising calculating an engine torque range and a motor torque range at a current torque requirement.

12. The method of claim 11, wherein calculating the engine torque range and the motor torque range comprises calculating the engine torque range and the motor torque range at the current torque requirement based on a maximum torque and a minimum torque of the engine, which are hardware characteristics of the engine, and a maximum torque and a minimum torque of the motor, which are hardware characteristics of the motor.

13. The method of claim 12, wherein calculating the engine torque range and the motor torque range further comprises calculating the engine torque range by subtracting the motor torque range from the current torque requirement.

14. A method for controlling torque of a diesel hybrid vehicle, the method comprising:
calculating energy consumptions of an engine based on a lower heating value of fuel, fuel consumption rates, and nitrogen oxide (NOx) emissions when determining an engine torque and a motor torque based on an equivalent consumption minimization strategy (ECMS) in the diesel hybrid vehicle; and
controlling the torque of the diesel hybrid vehicle, based on the engine torque and the motor torque determined.

15. The method of claim 14, wherein calculating the energy consumptions of the engine comprises detecting fuel consumption rates that correspond to respective engine torques within an engine torque range and engine speeds relevant to the respective engine torques based on a map having fuel consumption rates recorded therein, which are relevant to engine torques and engine speeds.

16. The method of claim 14, wherein calculating the energy consumptions of the engine comprises:
assigning weighting values to each of the fuel consumption rates and a corresponding one of the NOx emissions, respectively;
adding the fuel consumption rate and the corresponding one NOx emission to which the weighting values are assigned; and
multiplying the addition result by the lower heating value of the fuel.

17. The method of claim 14, wherein calculating the energy consumptions of the engine comprises calculating each of the energy consumptions $\vec{P}_{fuel}$ of the engine, based on the following equation $$\vec{P}_{fuel} = Q_{LHV}((1-x_{NO_x}) \cdot \dot{m}_{fuel} + x_{NO_x} \cdot \dot{m}_{NO_x})$$

where $Q_{LHV}$ denotes the lower heating value of the fuel, $x_{NO_x}$ denotes a weighting value, $\dot{m}_{fuel}$ denotes a fuel consumption rate, and $\dot{m}_{NO_x}$ denotes a NOx emission.

18. A system for controlling torque of a diesel hybrid vehicle, the system comprising:
a processor; and
a non-transitory computer-readable storage medium storing a program to be executed by the processor, the program including instructions for
calculating energy consumptions of an engine for respective engine torques within an engine torque range;
calculating energy consumptions of a battery for respective motor torques within a motor torque range;
calculating a plurality of total energy consumptions based on the energy consumptions of the engine and the energy consumptions of the battery; and
controlling the torque of the diesel hybrid vehicle based on an engine torque and a motor torque that are relevant to the minimum of the plurality of total energy consumptions, wherein the energy consumptions of the engine are calculated based on a lower heating value of fuel, fuel consumption rates, and nitrogen oxide (NOx) emissions.

19. The system of claim 18, wherein calculating the energy consumptions of the engine comprises:

assigning weighting values to each of the fuel consumption rates and a corresponding one of the NOx emissions, respectively;

adding the fuel consumption rate and the corresponding one NOx emission to which the weighting values are assigned; and multiplying the addition result by the lower heating value of the fuel.

20. The system of claim 18, wherein calculating the energy consumptions of the engine comprises calculating each of the energy consumptions $\vec{P}_{fuel}$ of the engine, based on the following Equation $$\vec{P}_{fuel} = Q_{LHV}((1-x_{NO_x}) \cdot \dot{m}_{fuel} + x_{NO_x} \cdot \dot{m}_{NO_x})$$

where $Q_{LHV}$ denotes the lower heating value of the fuel, $x_{NO_x}$ denotes a weighting value, $\dot{m}_{fuel}$ denotes a fuel consumption rate, and $\dot{m}_{NO_x}$ denotes a NOx emission.

\* \* \* \* \*